Figure 1:
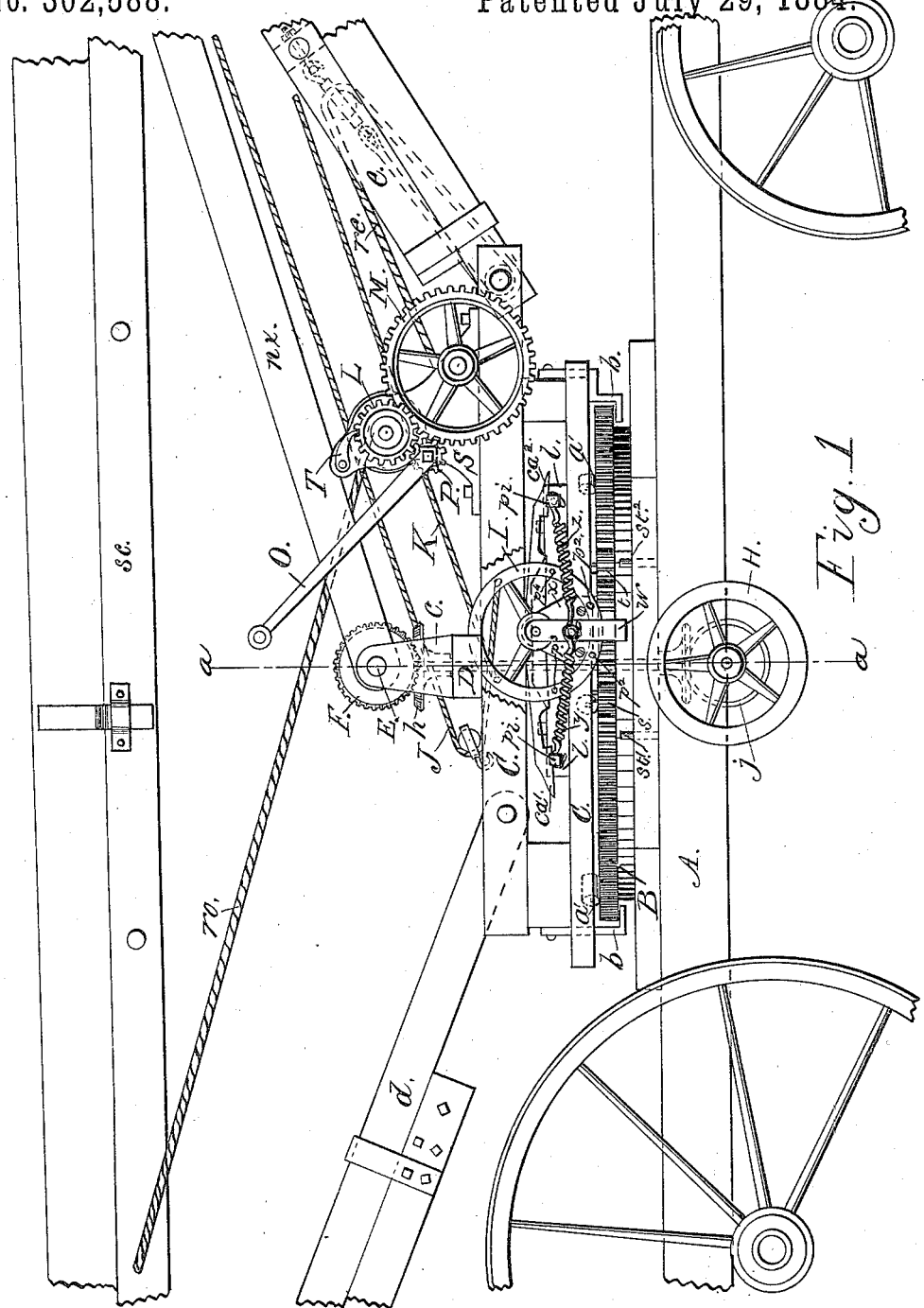

(No Model.)
4 Sheets—Sheet 1.

A. B. & J. N. D. REEVES.
STRAW STACKER.

No. 302,588. Patented July 29, 1884.

WITNESSES:
Frank A. Jacob.
E. O. Abbott.

INVENTORS:
Alfred B. Reeves.
James N. D. Reeves.
By H. P. Hood
Atty.

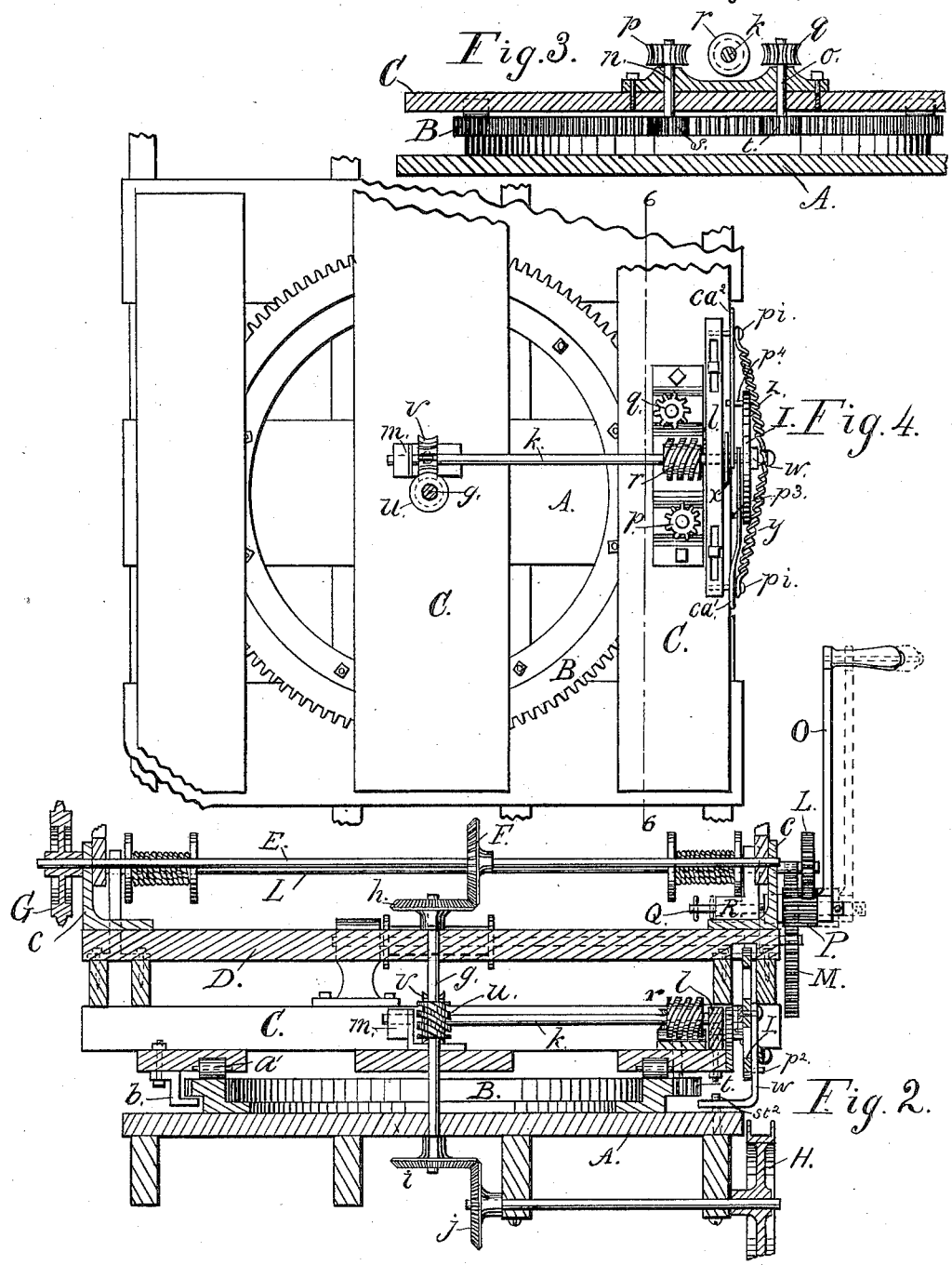

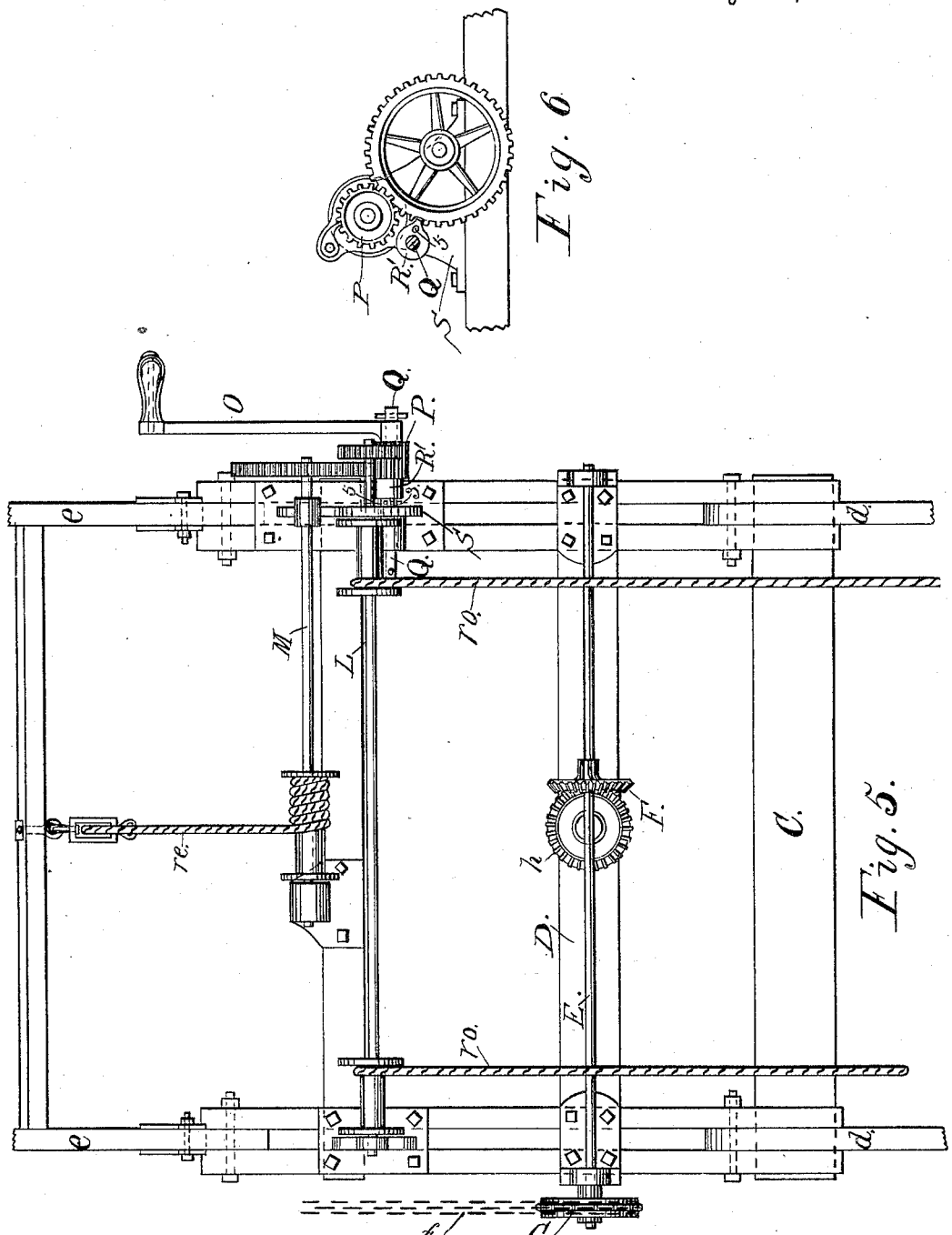

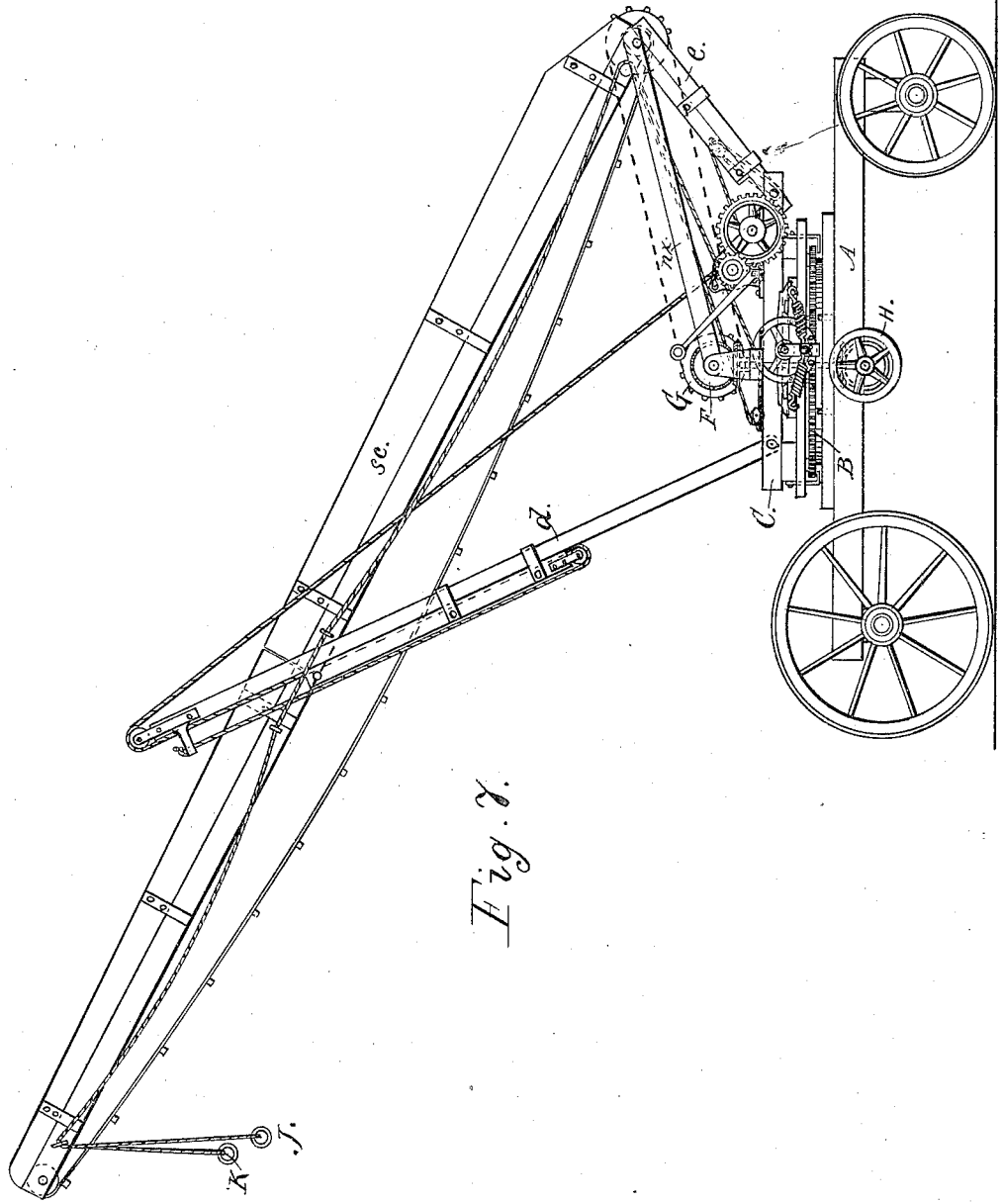

UNITED STATES PATENT OFFICE.

ALFRED B. REEVES AND JAMES N. D. REEVES, OF COLUMBUS, INDIANA.

STRAW-STACKER.

SPECIFICATION forming part of Letters Patent No. 302,588, dated July 29, 1884.

Application filed March 3, 1884. (No model.)

*To all whom it may concern:*

Be it known that we, ALFRED B. REEVES and JAMES N. D. REEVES, citizens of the United States, residing at Columbus, in the county of Bartholomew and State of Indiana, have invented certain new and useful Improvements in Straw-Stackers, of which the following is a specification.

Our invention relates to improvements in a straw-stacker for which Letters Patent No. 284,234 were granted to M. T. and A. B. Reeves, September 4, 1883. Said straw-stacker consists, essentially, of a trough traversed by a conveyer-belt forming a straw-carrier, which is adjustably connected with a central pillar by two pairs of extensible braces which are extended separately, and a pair of non-extensible braces. Said pillar is arranged to turn on a hollow pivot secured to a fixed base-frame, for the purpose of distributing the straw from a thrashing-machine over a curved area.

The objects of our improvements are as follows: first, to provide a broad base and a low bearing on which the straw-carrier support may turn, thus dispensing with the hollow central pillar and its central hollow pivot, and giving greater stability to the turning support; secondly, to rotate the straw-carrier support and straw-carrier by means of mechanism adapted to be connected at will with the mechanism by which the straw-carrier belt is driven; thirdly, to provide means whereby the mechanism for rotating the carrier-support and the straw-carrier, when once connected with the before-mentioned driving mechanism, will automatically cause the straw-carrier support to continue to rotate alternately in opposite directions until said mechanisms are disconnected; fourthly, to provide means whereby the automatic oscillation of the straw-carrier support may be controlled, so as to cause the discharging end of the straw-carrier to move over a long or a short path, as may be desired; fifthly, to provide means for adjusting the height of both ends of the straw-carrier simultaneously or separately, as may be desirable; sixthly, to provide means whereby the windlass controlling the receiving end of the straw-carrier may be locked in position before the discharging end of the straw-carrier can be separately adjusted.

The accompanying drawings illustrate our invention.

Figure 1 represents a side elevation; Fig. 2, a section through $a$, Fig. 1; Fig. 3, a section at line 6, Fig. 4; Fig. 4, a plan of the mechanism for oscillating the carrier laterally. Fig. 5 is a plan of the mechanism for raising the straw-carrier; Fig. 6, a partial elevation of the same; Fig. 7, a side elevation of the entire stacker.

The construction of our stacker is as follows:

A represents the foundation-frame, which is designed to be mounted on carrying-wheels. To the upper surface of frame A is rigidly secured an annular cog-wheel, B, having cog-teeth on its outer periphery. Said cog-teeth do not extend the whole depth of wheel B, but are cut short, leaving a space between their lower ends and the planking on frame A.

C is a rectangular frame, forming a turn-table, having friction-rolls $a'$ $a'$ secured to its under surface, which rolls rest upon the upper side of wheel B. Turn-table C is movably secured on wheel B, and held concentric therewith by means of clasps $b$ $b$, which are bolted to said frame, extending downward therefrom and hooking under the lower ends of the cogs on said wheel. A pair of brackets, $c$ $c$, are secured to opposite ends of a central timber, D, forming part of frame C. Said brackets form bearings for a horizontal shaft, E, on which is secured a bevel gear-wheel, F, and a sprocket-wheel, G. The straw-carrier $s$ $c$ is mounted on two pairs of extensible supports, $d$ and $e$, and a pair of non-extensible supports, $n$ $x$. Said extensible supports are pivoted to opposite ends of the straw-carrier and to the turn-table C, and the non-extensible supports are pivoted to shaft E and to the driving-shaft on the straw-carrier, the arrangement and operation being substantially the same as that shown and described in the before-mentioned patent to M. T. and A. B. Reeves. A chain-belt, $f$, passes over sprocket-wheel G and a similar wheel on the driving-shaft of the straw-carrier, and motion is conveyed to said sprocket-wheel by means of a vertical shaft, $g$, located in the center of wheel B, a horizontal shaft, to which the driving-pulley H is secured and bevel gear-wheels F, $h$, $i$, and $j$.

For the purpose of rotating the turn-table

C by means of the straw-carrier-driving mechanism, a horizontal shaft, $k$, is mounted in a sliding bearing, $l$, and a swinging bearing, $m$, both secured to the floor of the turn-table C. Short vertical shafts $n$ $o$ are mounted in bearings on the turn-table and carry on their upper ends screw gear-wheels $p$ and $q$, each adapted to engage a screw, $r$, on shaft $k$, and on their lower ends spur-pinions $s$ and $t$, both meshing with the cogs on wheel B. Said shafts $n$ $o$ are placed a little farther apart than the diameter of the screw $r$, so that said screw may revolve without engaging either. Motion is given to shaft $k$ by means of a screw, $u$, on shaft $g$, and a corresponding gear-wheel, $v$, on shaft $k$. Shaft $k$ revolves continuously with shaft $g$, and when screw $r$ is disengaged from both of gear-wheels $p$ and $q$, the turn-table C will remain stationary, or may be turned by the operator pushing against the side of the turn-table. By slipping bearing $l$ toward one of the gear-wheels $p$ or $q$, screw $r$ is engaged with said gear-wheel and the corresponding pinion $s$ or $t$ is revolved, thereby turning the turn-table and the straw-carrier.

For the purpose of automatically turning the turn-table and the straw-carrier alternately in opposite directions, a lever, $w$, is pivoted at one end to a standard, $x$, which is rigidly secured to the turn-table. Said lever $w$ is connected with opposite ends of bearing $l$ by spiral springs $y$ and $z$, of about equal tension, each secured at one end to the bearing $l$ and at the other end to lever $w$, as shown. Pivoted also to standard $x$ are two drop-catches, $ca'$ and $ca^2$. Said catches are adapted to engage pins $pi$, projecting from sliding bearing $l$, for the purpose of holding the bearing in place when the screw $r$ is engaged with either of the gear-wheels $p$ or $q$. Said latches are both out of engagement with their respective pins when neither of said gear-wheels is engaged.

I is a wheel, which is pivoted to standard $x$, and has pins $p'$ and $p^2$ projecting from its side in the path of lever $w$, and pins $p^3$ and $p^4$ arranged to come in contact with the lower edge of catches $ca'$ and $ca^2$. Stops $st'$ and $st^2$ are inserted in frame A in the path of lever $w$, as the turn-table to which said lever is attached rotates in one or the other direction. The operation of this part of our device is as follows: Screw gear-wheel $r$, being engaged with gear-wheel $p$, and shaft $k$ revolving, the turn-table slowly rotates, moving lever $w$ toward stop $st'$. The turn-table continues to move forward after the lever comes in contact with the stop, and the lever being detained the tension on spring $y$ is increased and spring $z$ released, the sliding bearing $l$, to which the springs are attached, being prevented from moving by the catch $ca^2$. As the turn-table continues to advance lever $w$ comes into contact with pin $p^2$ in wheel I, and thereby turning said wheel, pin $p^4$ is brought in contact with the lower side of catch $ca^2$ and the catch is raised, thus releasing the sliding bearing $l$, which, with shaft $k$, is then instantly drawn by spring $y$ toward gear-wheel $q$, causing the screw $r$ to intermesh therewith and reversing the movement of the turn-table, which continues to move in the new direction till lever $w$ comes in contact with stop $st^2$, when the direction of movement is again reversed in an exactly similar manner. The proportionate part of a complete revolution made by the turn-table is governed by the distance between the stops, which may be placed in any one of a series of holes made in the floor of frame A.

It is important to notice here the purpose of catches $ca'$ and $ca^2$ and springs $y$ and $z$. If the connection between lever $w$ and bearing $l$ were rigid, catches $ca'$ and $ca^2$ could not be used, and when the lever came in contact with the stop the turn-table, moving slowly and having, therefore, but little momentum, would continue to rotate only until bearing $l$ was moved just far enough to withdraw screw $r$ from engagement with its corresponding gear-wheel. The turn-table would then stop, there not being movement enough of the bearing $l$ to carry the screw into engagement with the opposite gear-wheel. This further movement is accomplished by the catch holding the sliding bearing $l$ until the spring has acquired sufficient tension to draw the screw over into the opposite gear-wheel, when the sliding bearing is released by the raising of the catch, as before explained.

For the purpose of enabling a person on the straw-stack to throw the turn-table-rotating mechanism into or out of engagement, cords J and K are attached to wheel I and passed through suitable guides to the discharging end of the straw-carrier, cord J being arranged to turn the wheel in one direction, and cord K arranged to turn it in the opposite direction.

For the purpose of operating the extension-supports $d$ and $e$, and thereby raising the straw-carrier, two windlasses, L and M, are mounted in bearings on the turn-table. Windlass L receives ropes $ro$ $ro$, which operate the sliding parts of braces $d$. The weight of the outer or discharging end of the straw-carrier tends to raise the receiving end, and windlass M and rope $re$ are arranged to draw the sliding parts of braces $e$ downward. Windlasses L and M are turned by means of a crank, O, and pinion P. Said crank and pinion are rigidly secured to a short shaft, Q, which is arranged to revolve and to slide longitudinally in a bearing, R, on standard S. Pinion P is of sufficient width to engage the gear-wheels of windlasses L and M simultaneously, and is arranged to remain in engagement with windlass L at all times, but is disengaged from windlass M by sliding shaft Q outward, as shown in Fig. 2 in dotted lines.

For the purpose of locking windlass M when pinion P is disengaged therefrom, a dog, R', having one or more teeth adapted to engage the cog-teeth on windlass M, is mounted loosely on shaft Q, being kept in place against pinion P by a pin, 3, through the shaft. Shaft Q is adapted to turn in dog R', but is prevented from sliding longitudinally therein by pin 3.

When pinion P is withdrawn from windlass M, dog R' is also drawn outward, and the teeth thereon intermesh with those on windlass M, and hold said windlass from turning in either direction, dog R' being prevented from turning on shaft Q by a pin, 5, which projects from the side of the block and engages in the standard S, in which shaft Q and the windlasses have their bearing. With this construction, the act of disengaging the pinion P from windlass M, for the purpose of operating windlass independently, also locks windlass M in position. Windlass L is prevented from turning backward by a pawl, T.

We claim as our invention—

1. In a straw-stacker, a stationary base-frame, a turn-table, two pinions secured to shafts on said turn-table and both intermeshing with a cog-wheel secured to said base-frame, a straw-carrier, a series of shafts, pulleys, and gear-wheels arranged to communicate motion to the conveyer-belt of said straw-carrier, intermediate mechanism, substantially as described, receiving motion from one of the shafts of said series, and arranged to communicate motion to either of said pinions, and means for shifting said intermediate mechanism from one to the other of said pinions, all combined substantially as specified.

2. In a straw-stacker, the combination, with a base-frame, a cog-wheel secured to said frame, a turn-table, and a straw-carrier on said turn-table, of vertical shaft $g$, screw $u$, gear-wheel $v$, shaft $k$, screw $r$, sliding bearing $l$, screw gear-wheels $p$ and $q$, vertical shafts $n$ and $o$, and pinions $s$ and $t$, all substantially as and for the purpose specified.

3. The combination, with a stationary base-frame, a cog-wheel secured to said base-frame, a turn-table, two vertical shafts on said turn-table, pinions on one end of each of said shafts intermeshing with said cog-wheel, screw gear-wheels on the opposite ends of said vertical shafts, a screw, and a horizontal shaft carrying said screw and arranged to oscillate between said screw-gears, of standard $x$, lever $w$, wheel I, provided with pins $p'$, $p^2$, $p^3$, and $p^4$, catches $ca'$ and $ca^2$, springs $y$ and $z$, and stops $st'$ and $st^2$, all substantially as and for the purpose specified.

4. In a straw-stacker, the combination, with wheel I, having pins $p'$, $p^2$, $p^3$, and $p^4$, catches $ca'$ and $ca^2$, lever $w$, sliding bearing $l$, and springs $y$ and $z$, secured to said lever and to said sliding bearing, of cords J and K, all substantially as and for the purpose specified.

5. In a straw-stacker, the combination of standard S, windlasses L and M, crank O, pinion P, sliding shaft Q, a supporting-frame, and a straw-carrier, all substantially as and for the purpose specified.

6. In a straw-stacker, the combination of a straw-carrier, a supporting-frame, standard S, windlasses L and M, pinion P, dog R', sliding shaft Q, and crank O, all substantially as and for the purpose specified.

ALFRED B. REEVES.
JAMES N. D. REEVES.

Witnesses:
JEFF B. REEVES,
WM. A. ABBETT.